United States Patent
Kasamatsu et al.

(10) Patent No.: US 6,911,282 B2
(45) Date of Patent: Jun. 28, 2005

(54) NON-AQUEOUS ELECTROLYTE SECONDARY BATTERY

(75) Inventors: Shinji Kasamatsu, Katano (JP); Harunari Shimamura, Moriguchi (JP); Yoshiaki Nitta, Hirakata (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 342 days.

(21) Appl. No.: 10/220,885

(22) PCT Filed: Mar. 6, 2001

(86) PCT No.: PCT/JP01/01747
§ 371 (c)(1),
(2), (4) Date: Sep. 5, 2002

(87) PCT Pub. No.: WO01/67528
PCT Pub. Date: Sep. 13, 2001

(65) Prior Publication Data
US 2003/0096168 A1 May 22, 2003

(30) Foreign Application Priority Data
Mar. 7, 2000 (JP) ........................................ 2000-061483
Mar. 2, 2001 (JP) ........................................ 2001-058323

(51) Int. Cl.⁷ ............................ H01M 4/58; H01M 4/62
(52) U.S. Cl. .............................. 429/218.1; 429/231.95; 429/232; 429/231.5
(58) Field of Search .......................... 429/231.95, 232, 429/218.1, 231.5

(56) References Cited

U.S. PATENT DOCUMENTS 6,653,019 B1 * 11/2003 Shimamura et al. ...... 429/218.1

FOREIGN PATENT DOCUMENTS

| EP | 0 867 955 A1 | 9/1998 |
|----|----|----|
| JP | 07-240201 A | 9/1995 |
| JP | 09-063651 A | 3/1997 |
| JP | 10-223221 A | 8/1998 |
| JP | 11-086854 A | 3/1999 |
| JP | 2000-012018 A | 1/2000 |
| JP | 2000-012018 | * 1/2000 |

* cited by examiner

*Primary Examiner*—Patrick Ryan
*Assistant Examiner*—Thomas H. Parsons
(74) *Attorney, Agent, or Firm*—Akin Gump Strauss Hauer & Feld, LLP

(57) ABSTRACT

When the composite particle containing Si or Sn is used for the negative electrode, the ratio of the median diameter "Dc" of the conductive material to the median diameter "Da" of the negative electrode material (Dc/Da) is made from 0.02 to 0.5 in order to improve reduction in electron conductivity, which is attributed to fine division of the particles due to repeated charge/discharge.

5 Claims, 1 Drawing Sheet

US 6,911,282 B2

NON-AQUEOUS ELECTROLYTE SECONDARY BATTERY

TECHNICAL FIELD

The present invention relates to a non-aqueous secondary battery which has high capacity and where reduction in discharge capacity due to cycles is improved, and specifically relates to the negative electrode thereof.

BACKGROUND ART

Recently, lithium secondary batteries used as main electrical sources for mobile communicating appliances, portable electrical appliances and the like have high potential force and energy density.

A carbon material capable of absorbing and desorbing lithium ions has been used as the negative electrode material of the lithium secondary battery. However, the theoretical capacity of graphite, which is one of the carbon materials, is 372 mAh/g and this is only about 10% of theoretical capacity of elemental metallic lithium. In order to further increase the capacity of the lithium secondary battery, therefore, it is essential to develop novel types of negative electrode materials.

From this viewpoint, for example, Japanese Laid-open patent publication No. Hei 7-240201 has proposed a silicate of non-iron metal as a negative electrode material, while Japanese Laid-open patent publication No. Hei 9-63651 has proposed a negative electrode material which is composed of an intermetallic compound comprising a 4B Group element and at least one of P and Sb and has a crystal structure of $CaF_2$ type, ZnS type or AlLiSi type.

Japanese Laid-open patent publication No. Hei 11-86854 has proposed a negative electrode material comprising particles which include a phase composed of Si, Sn or the like and a phase composed of an intermetallic compound whose constituent elements are Si, Sn and the like.

However, the electron conductivity of the alloy material containing at least Si or Sn as thus described is not very high. When this alloy material is used for the electrode, therefore, a conductive material should also be used for the purpose of enhancing the electron conductivity in the electrode.

There is also a problem that a volume change of the alloy material containing at least Si or Sn at the time of absorbing and desorbing lithium is relatively larger than that of the carbon material or the like. Namely, an alloy powder used for the negative electrode of the lithium secondary battery is destroyed through the repetition of charge/discharge to be more finely divided. Occurrence of the fine division causes generation of particles that cannot be involved in an electrochemical reaction, leading to deterioration of the electron conductivity as a whole.

Accordingly, it is an object of the present invention to provide a negative electrode for a non-aqueous electrolyte secondary battery having an improved charge/discharge cycle characteristic by using an alloy containing at least silicon or tin as a constituent element for the negative electrode and improving the electron conductivity of the negative electrode thereof, thereby solving the aforesaid problems.

DISCLOSURE OF INVENTION

The present invention relates to a non-aqueous electrolyte secondary battery comprising a negative electrode containing: a negative electrode material composed of a composite particle having a core particle and a coating layer covering at least a part of surface of the core particle and capable of absorbing and desorbing lithium; and a conductive material composed of a graphite particle, characterized in that (a) a solid phase A constituting the core particle is composed of at least one element selected from the group consisting of silicon and tin, (b) a solid phase B constituting the coating layer is composed of a solid solution or an intermetallic compound, which comprises at least one selected from the group consisting of silicon and tin and at least one selected from the group consisting of elements of the second to the fourteenth Groups except silicon, tin, and carbon, and (c) the ratio of the median diameter "Dc" of the conductive material to the median diameter "Da" of the negative electrode material (Dc/Da) is from 0.02 to 0.5.

It is effective that the solid phase A is composed of tin and the solid phase B is composed of $Ti_2Sn$.

It is also effective that the solid phase A is composed of silicon and the solid phase B is composed of $TiSi_2$.

It is also effective that from 5 to 60 parts by weight of the conductive material are contained per 100 parts by weight of the negative electrode material.

It is also effective that the negative electrode material has a median diameter of from 0.1 to 500 μm.

BEST MODE FOR CARRYING OUT THE INVENTION

Figure 1:
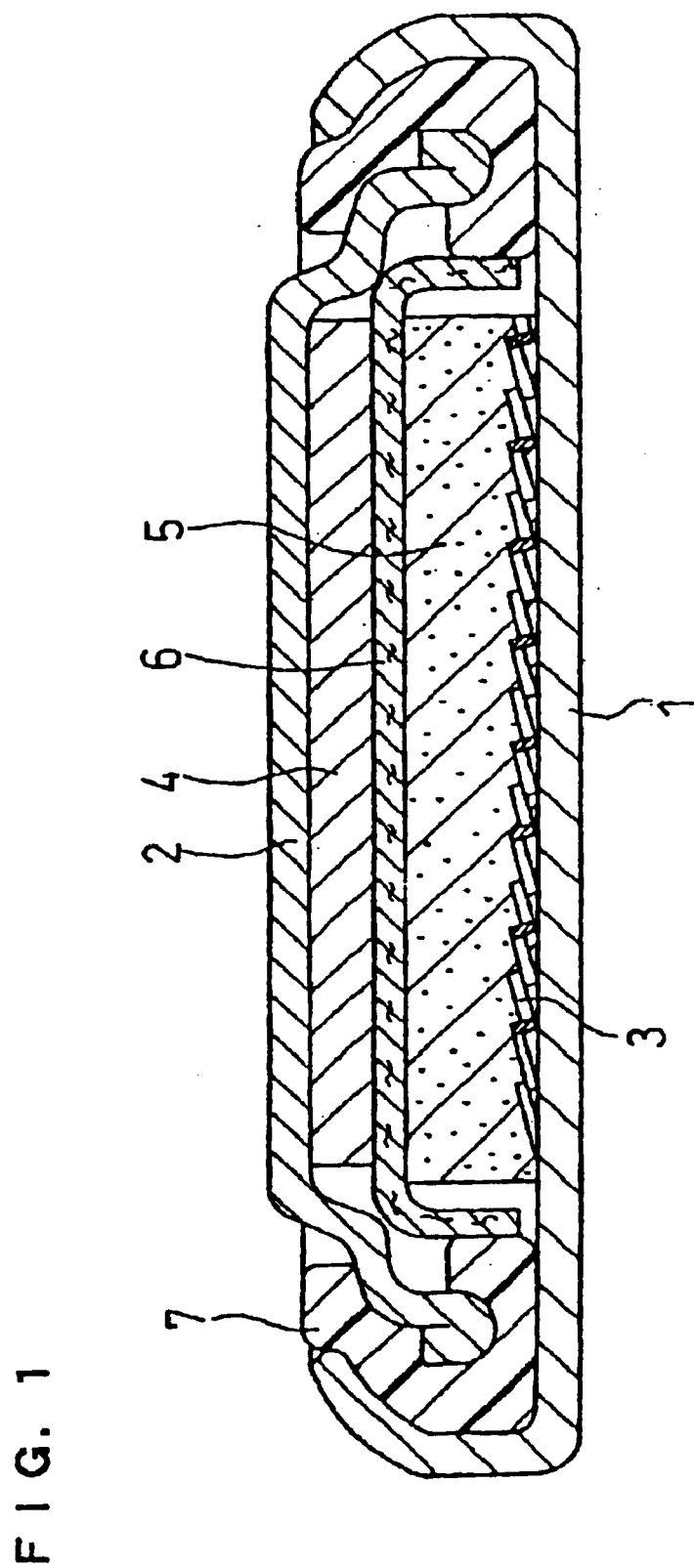
FIG. 1 is a longitudinal sectional view illustrating a coin type non-aqueous electrolyte secondary battery used in the examples of the present invention.

The prime characteristic of a non-aqueous electrolyte secondary battery in accordance with the present invention lies in the configuration of the negative electrode thereof.

That is to say, the present inventors used a composite particle given by covering at least a part of surface of a core particle composed of a solid phase A with a solid B, as a negative electrode material (negative electrode active material) contained in the negative electrode of the present invention, and made the solid phase A composed of at least one selected from the group consisting of silicon and tin, while making the solid phase B composed of a solid solution or an intermetallic compound which comprises at least one selected from the group consisting of silicon and tin and at least one selected from the group consisting of elements of the second to the fourteenth Groups except silicon, tin, and carbon.

As a result of their wholehearted efforts on the study, the present inventors have found that a non-aqueous electrolyte secondary battery having the improved charge/discharge cycle characteristic can be obtained when using a graphite particle as a conductive material and making the ratio of the median diameter "Dc" of the conductive material to the median diameter "Da" of the negative electrode material (Dc/Da) from 0.02 to 0.5.

The following are considered to be the reasons for the improvement in charge/discharge cycle characteristic within this range of the particle size ratio:

When the particle size ratio is in the above range, a plurality of contact interfaces between the surface of the composite particle as the negative electrode material and a graphite particle as the conductive material can be formed, permitting an increase in contact area.

Because the conductive material is readily filled in spaces among the particles of the negative electrode material and the like and the dispersion degree thereof is improved, the electron conductivity of the negative electrode further becomes better. It is therefore possible to obtain a negative electrode with a satisfactory electron conductive network formed therein.

Moreover, even in a case where the negative electrode material particle is finely divided through the repetition of charge/discharge, an influence exerted on the charge/discharge cycle characteristic can be reduced because the conductive material particles present around the negative electrode material particles form the favorable electron conductive network.

On the other hand, when the particle size ratio, Dc/Da, is less than 0.02, the size of the conductive material particle is excessively small compared to that of the negative electrode material particle, resulting in the increased number of the particles per unit weight.

In this case, the number of the conductive material particles involved in an electron conductive pathway from the negative electrode material to a current collector becomes greater, which increases not only the contact interface between the negative electrode material particle and the conductive material particle but also the contact interface between the conductive material particles, making the electron conductive pathway too complicated for obtainment of sufficient charge/discharge characteristic.

When the particle size ratio, Dc/Da, exceeds 0.5, the contact area of the conductive material to the core particle in the negative electrode material becomes smaller and thus the sufficient current collecting performance cannot be obtained, which is not desirable.

It is to be noted that the median particle sizes of the negative electrode material and the conductive material can be measured by a wet and laser type particle size distribution measuring method.

The positive electrode and negative electrode for use in the present invention are produced by applying a mixture layer including a positive electrode material and a negative electrode material capable of absorbing and desorbing lithium electrochemically and reversibly, a conductive material, a binder and the like onto the surface of the current collector.

The negative electrode material used in the present invention comprises the composite particle given by covering the whole area or a part of periphery of the core particle composed of the solid phase A with the solid phase B, and the solid phase A is composed of at least one selected from the group consisting of silicon and tin, while the solid phase B is composed of the solid solution or the intermetallic compound which comprises at least one selected from the group consisting of elements of the second to the fourteenth Groups except silicon, tin, and carbon, and at least one selected from the group consisting of silicon and tin.

The preferable combinations of the solid phase A and the solid phase B are shown in Table 1.

TABLE 1

| Solid phase A | Solid phase B |
|---|---|
| Sn | $Ti_2Sn$, $Mg_2Sn$, $FeSn_2$, $MoSn_2$, Zn—Sn solid solution Cd—Sn solid solution, In—Sn solid solution Pb—Sn solid solution |
| Si | $Mg_2Si$, $CoSi_2$, $NiSi_2$, Zn—Si solid solution, Al—Si solid solution, Sn—Si solid solution, $TiSi_2$ |

Here, a method for producing the composite particle which is the negative electrode material of the present invention will be described:

The composite particle of the present invention is composed of a solid solution or an intermetallic compound. This composite particle is hence obtained by melting a mixture, obtained by mixing the constituent elements thereof at a prescribed ratio at a high temperature, followed by quenching and solidifying the melt by a dry spraying method, a roll quenching method, a rotating electrode method or the like. At that time, the particle size is adjusted by grinding and sieving, or the like, if necessary.

If further necessary, the preferred metallographical structure of the solid solution or the intermetallic compound can be obtained by heat treatment at a lower temperature than the temperature of the solidus line at a ratio of constituent elements of the particle in the metal constitutional diagram.

This method is to obtain the negative electrode material of the present invention by making the solid phase B deposited to cover the whole area or a part of periphery of the core composed of the solid phase A by quenching and solidifying the melt.

While uniformity of the phase A and the phase B can be enhanced through subsequent heat treatment, the negative electrode material of the present invention can also be obtained without heat treatment. The method of quenching and solidifying is not limited to the aforesaid method.

A layer (precursor layer) composed of the constituent elements of the solid phase B, from which the the constituent elements of the solid phase A are excluded, is adhered onto the surface of the powder composed of the solid phase A, which is then heat-treated at a lower temperature than the solidus temperature at a ratio of constituent elements of the particle in the metal constitutional diagram, to obtain the negative electrode material of the present invention.

By this heat treatment, the constituent elements of the solid phase A diffuse into the precursor layer to change the composition of the precursor layer, which then becomes the solid phase B.

The examples of the method for adhering the precursor layer may include a plating method and a mechanical alloying method.

In the mechanical alloying method, the composite particle of the present invention can be obtained without heat treatment.

It should be noted that the method for the adhesion is not limited to the aforesaid methods.

Furthermore, other methods for producing negative electrode materials will be described:

The combination of the constituent elements of the solid phase A and the constituent elements of the solid phase B from which the constituent elements of the solid phase A are excluded, or an ingot obtained from the above combined elements by an arc welding method is used as a starting material to obtain the composite particle of the present invention by a mechano-milling technique such as a mechanical alloy method or a mechanical grinding method where an Atrita mill, a ball mill, a planetary-style ball mill, an impact mill or the like is used.

In this case, the use of a reaction atmosphere containing a nitrogen gas, such as a reaction atmosphere containing nitrogen gas at 50% or more of a total volume of all the gases, is preferred.

A conductive material used in the present invention is a graphite particle. Graphite has high electron conductivity so as to compensate the electron conductivity of the negative electrode material, and it further has a relatively high wetting property in regard to the non-aqueous electrolyte so as to make conductivity of a lithium ion favorable. Graphite constituting the graphite particle may be exemplified by such graphite as natural graphite (flake graphite and the like), artificial graphite and expanded graphite.

Among them preferred is graphite with distance between the carbon layers ($d_{002}$) calculated by wide angle X-ray diffraction is from 0.335 to 0.339 nm, which is excellent in electron conductivity.

These conductive materials may be used singly or in mixture of two or more of them. Further, the graphite material may be used in combination with other conductive materials.

It is preferable that from 5 to 60 parts by weight of the conductive material are contained per 100 parts by weight of the negative material. When 5 or less parts by weight are contained, sufficient electron conductivity cannot be acquired. When 60 or more parts by weight are contained, addition of such an excessive amount of the conductive material causes a substantial drop in electrode capacity, which is not practically desirable. The amount of the conductive material to be contained per 100 parts by weight of the negative electrode material is preferably from 5 to 60 parts by weight, and more preferably from 10 to 50 parts by weight.

Next, it is preferable that the median diameter of the negative electrode material is from 0.1 to 500 $\mu$m. When the median diameter of the negative electrode material is less than 0.1 $\mu$m, the surface area of the negative electrode material becomes larger, causing an increase in production amount of the surface oxidant as well as reduction in electron conductivity of the negative electrode material itself, which is not preferable. When the median diameter exceeds 500 $\mu$m, the contribution of the electron conductivity within the particle of the negative electrode material increases, resulting in an insufficient effect of improvement of the electron conductivity by means of the conductive material, which is not preferable.

The median diameter is preferably from 0.1 to 500 $\mu$m, and more preferably from 0.5 to 45 $\mu$m.

Herein, the binder for the negative electrode used in the present invention may be either of a thermoplastic resin or a thermosetting resin. As the preferable binder in the present invention, there are, for example, styrene butadiene rubber, polyvinylidene fluoride, ethylene-acrylic acid copolymer and ($Na^+$) ion-crosslinked polymer thereof, ethylene-methacrylic acid copolymer and ($Na^+$) ion crosslinked polymer thereof, ethylene-methyl acrylate copolymer and ($Na^+$) ion-crosslinked polymer thereof, and ethylene-methyl methacrylate copolymer and ($Na^+$) ion-crosslinked polymer thereof.

As for the current collector for the negative electrode used in the present invention, there is no specific limitation if it is an electron conductor which does not cause a chemical change in a constructed battery. As for a material constituting the current collector for the negative electrode, there are, for example, in addition to stainless steel, nickel, copper, titanium, carbon, conductive resin and the like, one obtained by treating the surface of copper or stainless steel with carbon, nickel or titanium. In particular, copper and copper alloy are preferable.

The surfaces of these materials may be oxidized.

The surfaces of these materials may also be made concave and convex through surface treatment.

As for the form of the current corrector for the negative electrode, a foil, a film, a sheet, a net, a punched article, a lath, a porous body, a foam, a molded body formed of fibers or the like may be employed. Although the thickness is not particularly limited, one having a thickness of 1 to 500 $\mu$m is employed.

The non-aqueous electrolyte secondary battery in accordance with the present invention comprises an electrolyte, and a positive electrode capable of absorbing and desorbing lithium and the aforesaid negative electrode.

The positive electrode used in the non-aqueous electrolyte secondary battery of the present invention is produced by applying a mixture including a positive electrode material capable of absorbing and desorbing lithium electrochemically and reversibly, a conductive agent, a binder and the like onto the surface of the current corrector.

As for the positive electrode material of the present invention, a lithium-contained compound or a lithium-free compound may be employed, and, for example, $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$ (M is at least one selected from the group consisting of Na, Mg, Sc, Y, Mn, Fe, Co, Ni, Cu, Zn, Al, Cr, Pb, Sb and B, x=0 to 1.2, y=0 to 0.9, z=2.0 to 2.3), and the like, can be cited.

Herein, the value "x" is a value before charge!discharge begins, which increases or decreases due to the charge/discharge. It is possible to use another positive electrode material such as a transitional metal chalcogenide, vanadium oxide and the lithium compound thereof, niobium oxide and the lithium compound thereof, a conjugate polymer using an organic conductive material, or a Chevrel phase compound. It is also possible to use a mixture of a plurality of different positive electrode materials.

Although the mean particle size of the positive electrode active material particles is not particularly limited, it is preferably from 1 to 30 $\mu$m.

The conductive material for the positive electrode used in the present invention is not particularly limited if it does not cause a chemical change at a charge/discharge potential of a positive electrode material to be used. For example, there are graphite such as natural graphite (flake graphite and the like) and artificial graphite, carbon blacks such as acetylene black, ketjen black, channel black, furnace black, lamp black and thermal black, conductive fibers such as carbon fiber and metal fiber, metallic powders of fluorinated carbon, aluminum and the like, conductive wiskers of zinc oxide, potassium titanate and the like, conductive metal oxides such as titanium oxide, and organic conductive materials such as polyphenylene derivatives, and they can be used singly or in an arbitrary combination of one or more.

Among these conductive materials, artificial graphite and acetylene black are particularly preferable.

Although the amount of the conductive material to be added is not particularly limited, it is preferably from 1 to 50% by weight, more preferably 1 to 30% by weight, to the positive electrode material. When carbon or graphite is employed, from 2 to 15% by weight is particularly preferable.

As for the binder for the positive electrode used in the present invention, it may be either of a thermoplastic resin or a thermosetting resin. Polyvinylidene fluoride (PVDF) and polytetrafluoroethlyene (PTFE) are preferred as the binder in the present invention.

As for the current collector for the positive electrode used in the present invention, any electron conductor may be employed if it does not cause a chemical change at a charge/discharge potential of the positive electrode material to be used. As the material for constituting the current collector for the positive electrode, there are, for example, in addition to stainless steel, aluminum, titanium, carbon, conductive resin and the like, one obtained by treating the surface of aluminum or stainless steel with carbon or titanium.

In particular, aluminum or aluminum alloy is preferred.

The surfaces of these materials may be oxidized. The surface of the current collector may also be made convex and concave by surface treatment.

As for the form of the current corrector, a foil, a film, a sheet, a net, a punched article, a lath, a porous body, a foam, a molded body formed of fibers or the like, is employed. Although the thickness is not particularly limited, one having a thickness of from 1 to 500 $\mu$m is used.

As for the electrode mixture, in addition to a conductive material and a binder, a variety of additives such as a filler, a dispersion agent, an ion conductor, a pressure enforcement agent can be used.

There is no specific limitation on the filer if it is a fibrous material which does not cause a chemical change in a constructed battery. Usually, olefin polymer such as polypropylene or polyethylene, or a fiber such as glass fiber or carbon fiber is used. Although the amount of the filler to be added is not particularly limited, from 0 to 30% by weight to the electrode mixture is preferred.

As for the structure of the negative electrode plate and the positive electrode plate in the present invention, it is preferable that at least the plane of the positive electrode mixture is present facing the plane of the negative electrode mixture.

The non-aqueous electrolyte used in the present invention comprises a solvent and a lithium salt dissolved in the solvent. As for the non-aqueous solvent, there are, for example, cyclic carbonates such as ethylene carbonate (EC), propylene carbonate (PC), butylene carbonate (BC) and vinylene carbonate (VC), chain carbonates such as dimethyl carbonate (DMC), diethyl carbonate (DEC), ethyl-methyl carbonate (EMC) and dipropyl carbonate (DPC), aliphatic carboxylic acid esters such as methyl formate, methyl acetate, methyl propionate and ethyl propionate, $\gamma$-lactones such as $\gamma$-butyrolactone, chain ethers such as 1,2-dimethoxy ethane (DME), 1,2-diethoxy ethane (DEE) and ethoxymethoxy ethane (EME), cyclic ethers such as tetrahydrofuran and 2-methyl tetrahydrofuran, and they can be used singly or in an arbitrary combination of one or more.

Among them, a mixture solvent of a cyclic carbonate and a chain carbonate, or a mixture solvent of a cyclic carbonate, a chain carbonate and an aliphatic carboxylic acid ester is preferred.

As for the lithium salt dissolved in these solvents, there are, for example, $LiClO_4$, $LiBF_4$, $LiPF_6$, $LiAlCl_4$, $LiSbF_6$, LiSCN, LiCl, $LiCF_3SO_3$, $LiCF_3CO_3$, $Li(CF_3SO_2)$ 2, $LiAsF_6$, $LiN(CF_3SO_2)_2LiB_{10}Cl_{10}$, lithium lower aliphatic carboxylate, LiCl, LiBr, LiI, chloroboranlithium, lithium tetraphenyl borate and imido, and they can be used singly or in an arbitrary combination of one or more. In particular, $LiPF_6$ is more preferably contained.

The particularly preferable non-aqueous electrolyte in the present invention is an electrolyte containing at least ethylene carbonate and ethyl methyl carbonate and, as the supporting salt, $LiPF_6$.

Although the amount of the electrolyte to be added in the battery is not particularly limited, a necessary amount can be used based on the amounts of the positive electrode material and the negative electrode material, and the size of the battery.

Although the amount of the supporting electrolyte to be dissolved in the non-aqueous solvent is not particularly limited, it is preferably to be from 0.2 to 2 mol/l. Particularly, it is more preferable to be from 0.5 to 1.5 mol/l.

Instead of the electrolyte, the following solid electrolytes can be used: Solid electrolytes can be categorized into the inorganic solid electrolytes and the organic solid electrolytes. As for the inorganic solid electrolytes, nitride, halogenide, oxyacid salt and the like of lithium are well known.

Among them effective are $Li_4SiO_4$, $Li_4SiO_4$—LiI—LiOH, $xLi_3PO_4$-$(1-x)Li_4SiO_4$, $Li_2SiS_3$, $Li_3PO_4$—$Li_2S$-$SiS_2$, phosphorous sulfide compound, and the like.

Among the organic solid electrolyte, for example, polymer materials such as polyethylene oxide, polypropylene oxide, polyphosphazen, polyaziridine, polyethylene sulfide, polyvinyl alcohol, polyvinylidene fluoride, polyhexafluoropropylene and the derivatives, mixtures and composites thereof are effective.

Furthermore, for the purpose of improving the discharge capacity and the charge/discharge characteristic, it is effective to add another compound to the electrolyte. For example, triethylphosphite, triethanolamine, cyclic ethers, ethylenediamine, n-grime, pyridine, triamide hexaphosphate, nitrobenzene derivatives, crown ethers, the fourth ammonium salts, ethylene glycol, dialkyl ether and the like can be cited.

As for the separator used in the present invention, a micro-porous membrane having large ion permeability, a prescribed mechanical strength and an insulating property is used. It is also preferable that the separator has the function to close a pore at a certain temperature or higher so as to increase the resistance. From the viewpoint of resistance properties to organic solvents and hydrophobic properties, a sheet, a non-woven fabric, a woven fabric or the like, each of which is made of an olefin polymer such as polypropylene or polyethylene, the combination thereof, or grass fibers, may be used.

The pore size of the separator is preferably in the range where the positive and negative electrode materials, the binder and the conductive material, which are desorbed from the electrode sheets, do not permeate, and it is desirable to be, for example, from 0.01 to 1 $\mu$m.

As for the thickness of the separator, a thickness of from 10 to 300 am is generally employed.

The vacancy ratio is determined in accordance with the permeability of electrons and ions, materials and an osmotic pressure, and in general, it is preferably to be from 30 to 80%.

It is also possible to constitute a battery in which a polymer material, which has been made to absorb and retain an organic electrolyte comprising a solvent and a lithium salt dissolved in the solvent, is contained in a positive electrode mixture and a negative electrode mixture and, further, a porous separator composed of a polymer absorbing and retaining the organic electrolyte is integrated with a positive electrode and a negative electrode. As for the polymer material, while any one capable of absorbing and retaining the organic electrolyte may be used, a vinylidene fluoride-hexafluoropropylene copolymer is particularly preferable.

Any forms of the batteries are applicable such as a coin type, a button type, a sheet type, a stacked type, a cylindrical type, a flat type, a rectangular type, a large type used for electric vehicles or the like.

While the non-aqueous electrolyte secondary battery in accordance with the present invention can be used for a portable information terminal, a portable electronic appliance, a home use compact power storage device, a motor bike, an electric vehicle, a hybrid electric vehicle or the like, it is not particularly limited thereto.

In the following, the present invention will be described in further detail by examples, but the present invention is not limited to those examples.

EXAMPLE 1

First, a negative electrode material was produced.

Powders or blocks of silicon and nickel, which would constitute the negative electrode, were introduced in a melting bath at an element ratio of Si:Ni=69:31 to be melted at 1,415° C., and the obtained melt was quenched and solidified by a roll quenching method to obtain a solid.

Subsequently, the solid was heat-treated at a temperature about 10 to 50° C. lower than the solidus line temperature of 993° C. in an inert atmosphere for 20 hours.

The heat-treated solid was pulverized in a ball mill and classified through a sieve to obtain a negative electrode material where a phase A was Si and a phase B was $NiSi_2$. As a result of microscope of these negative electrode materials, it was confirmed that the whole area or a part of periphery of the Si particle was covered with $NiSi_2$ in the negative electrode material.

Next, a coin type non-aqueous electrolyte secondary battery of R2016 size (a diameter of 20.0 mm, a total height of 1.6 mm) shown in FIG. 1 was produced.

In FIG. 1, a space between a cell case 1 made of a stainless steel plate and a cover 2 is air-tightly sealed via a gasket 7 made of polypropylene. A negative electrode material molded electrode 5 is integrally molded with a collector 3 made of a stainless-steal expanded metal, which is welded with the inner bottom of the cell case 1.

A disc-formed metallic lithium electrode 4 is attached by pressure to the inner face of the cover 2. A separator 6 made of a microporous polypropylene film segregates the negative electrode material molded electrode 5 from the metallic lithium electrode 4, and an organic electrolyte is introduced to be impregnated between those electrode, in the negative electrode material molded electrode 5 and in the separator 6.

Herein, the negative electrode material molded electrode 5 was produced by integrally molding a mixture, which was obtained by mixing a composite particle composed of Si and $NiSi_2$ (a median diameter of 17 μm or 55 μm) as a negative electrode material, a graphite material having a median diameter as a conductive material and polyvinylidene fluoride as a binder at a weight ratio of 85:10:5, onto the collector 3.

The negative electrode material molded electrode 5 molded in the cell case 1 was fully dried under a depressurized atmosphere at 80° C., and then coin type non-aqueous electrolyte secondary batteries A to O were fabricated.

As the organic electrolyte employed was a solution obtained by dissolving 1 mol/l of lithium phosphate hexafluoride as a solute, which was the electrolyte, in a mixture solvent of equivalent volumes of ethylene carbonate (EC) and diethyl carbonate (DEC).

The coin type non-aqueous electrolyte secondary batteries A to O were subjected to a charge/discharge cycle test. Specifically, at a constant current of current density of 0.5 mA/cm², the batteries were charged until the voltage became 0V and then discharged until the voltage became 3V. Under this condition, the charge/discharge was repeated. The charge/discharge were conducted in a constant temperature bath of 20° C.

It is to be noted that the charge/discharge was repeated 50 cycles and a ratio of discharge capacity at the 50th cycle, to the initial discharge capacity was calculated as a capacity maintenance ratio. The charge/discharge here were corresponded to charge/discharge reactions of the actual batteries. That is, a reaction of absorption of lithium into the negative electrode material (composite particle) was taken as the charge, while a reaction of desorption of the same therefrom was taken as the discharge.

The results are shown in Table 2.

TABLE 2

| Battery No. | Median diameter of $Si/NiSi_2$ composite particle (μm) | Median diameter of graphite particle (μm) | Capacity maintenance ratio (%) |
|---|---|---|---|
| A1 | 17 | 0.2 | 73 |
| B1 | 17 | 0.4 | 95 |
| C1 | 17 | 0.8 | 92 |
| D1 | 17 | 1.2 | 91 |
| E1 | 17 | 2 | 88 |
| F1 | 17 | 4 | 86 |
| G1 | 17 | 8 | 82 |
| H1 | 17 | 12 | 71 |
| I1 | 55 | 0.8 | 73 |
| J1 | 55 | 1.2 | 96 |
| K1 | 55 | 2 | 94 |
| L1 | 55 | 4 | 91 |
| M1 | 55 | 12 | 87 |
| N1 | 55 | 20 | 84 |
| O1 | 55 | 23 | 76 |

EXAMPLE 2

In the present example, a composite particle where a solid phase A was Sn and a solid phase B was $Mg_2Sn$ was used as the negative electrode material. This negative electrode material was produced in the same manner as in Example 1, except that the dissolution was conducted at 770° C. and the heat treatment was conducted at a temperature about 10 to 50° C. lower than 204° C.

Further, coin type non-aqueous electrolyte secondary batteries were produced in the same manner as in Example 1, except that the aforesaid negative electrode material was used, and then the batteries were subjected to the same test as Example 1. The results are shown in Table 3.

TABLE 3

| Battery No. | Median diameter of $Si/Mg_2Sn$ composite particle (μm) | Median diameter of graphite particle (μm) | Capacity maintenance ratio (%) |
|---|---|---|---|
| A2 | 18 | 0.2 | 71 |
| B2 | 18 | 0.4 | 93 |
| C2 | 18 | 0.8 | 93 |
| D2 | 18 | 1.2 | 89 |
| E2 | 18 | 2 | 87 |
| F2 | 18 | 4 | 84 |
| G2 | 18 | 8 | 83 |
| H2 | 18 | 12 | 70 |
| I2 | 41 | 0.8 | 76 |
| J2 | 41 | 1.2 | 95 |
| K2 | 41 | 2 | 93 |
| L2 | 41 | 4 | 90 |
| M2 | 41 | 12 | 87 |
| N2 | 41 | 20 | 85 |
| O2 | 41 | 23 | 73 |

EXAMPLE 3

In the present example, an alloy was synthesized by the following method:

A mixed powder containing metal of various kinds (they all had a particle size of not more than 45 µm) at a ratio corresponding to the composition of $Ti_2Sn$ was introduced into an Atrita mill (a capacity of 1000 ml) with 1.5 kg of a stainless ball (a diameter of 15 mm) put therein.

The Atrita mill used in the present example is a vertical rotary type and the uppermost part has a valve-structure capable of forming an arbitrary atmosphere (gas and pressure). The amount of the mixed powder to be introduced was 200 g.

The ball and the raw material powders constituted about two thirds of inside of the Atrita mill by volume.

In the present example, the synthesis was conducted under conditions of nitrogen atmosphere of 1.1 atm. An alloy was synthesized by milling for one hour at a constant rotation of 800 rpm under the above atmosphere. After the synthesis, powders with a mean particle size of about 10 µm were obtained.

The particles were analyzed by X-ray diffraction to find that all of them have either a low crystal structure or an amorphous structure showing a broad peak shape.

The particles were further observed with a transmission electron microscope to confirm the presence of metallic tin therein, and it was thus found that the particles were composite particles comprising a phase A composed of Sn and a phase B composed of $Ti_2Sn$, and also containing Tin and the like.

Coin type non-aqueous electrolyte secondary batteries were produced in the same manner as in Example 1, except that the negative electrode material as thus obtained was used, and then the same test as that of Example 1 was conducted. The results are shown in Table 4.

TABLE 4

| Battery No. | Median diameter of $Si/Ti_2Sn$ composite particle (µm) | Median diameter of graphite particle (µm) | Capacity maintenance ratio (%) |
|---|---|---|---|
| A3 | 17 | 0.1 | 74 |
| B3 | 17 | 0.4 | 93 |
| C3 | 17 | 0.8 | 94 |
| D3 | 17 | 1.2 | 89 |
| E3 | 17 | 2 | 87 |
| F3 | 17 | 4 | 83 |
| G3 | 17 | 8 | 70 |
| H3 | 17 | 12 | 63 |

EXAMPLE 4

In the present example, an alloy was synthesized by the following method:

A mixed powder containing metal of various sorts (a Ti powder, an Si powder and others all had a particle size of not more than 150 µm) at a ratio corresponding to the composition of $TiSi_2$ was introduced into an Atrita mill (a capacity of 1000 ml) with 2 kg of a stainless ball (a diameter of 6 mm) put therein.

The Atrita mill used in the present example is a horizontal rotary type and the uppermost part has a valve-structure capable of forming an arbitrary atmosphere (gas and pressure). The amount of the mixed powder to be introduced was 80 g.

The ball and the raw material powders constituted about two thirds of inside of the Atrita mill by volume.

It was possible to employ another synthesizing mill such as a vertical Atrita mill, a ball mill, a vibrating ball mill, a planetary-style ball mill, a rod mill or Aquamizer (produced by Hosokawa Micron) and to use devices with those mills applied thereto, for the similar synthesis of the alloy to the above.

In the present example, the synthesis was conducted under an argon atmosphere of 1 atm. An alloy was synthesized by milling for 15 hours at a constant rotation of 1,000 rpm under the above atmosphere. After the synthesis, powders with a mean particle size of about 17 µm were obtained.

The particles were analyzed by X-ray diffraction to find that all of them have either a low crystal structure or an amorphous structure showing a broad peak shape.

The particles were further observed with a transmission electron microscope to confirm the presence of the metallic silicon therein, and it was thus found that the particles were composite particles comprising a phase A composed of Si and a phase B composed of $TiSi_2$.

Coin type non-aqueous electrolyte secondary batteries were produced in the same manner as in Example 1, except that the negative electrode material as thus obtained was used, and then the same test as that of Example 1 was conducted. The results are shown in Table 5.

TABLE 5

| Battery No. | Median diameter of $Si/TiSi_2$ composite particle (µm) | Median diameter of graphite particle (µm) | Capacity maintenance ratio (%) |
|---|---|---|---|
| A4 | 17 | 0.1 | 70 |
| B4 | 17 | 0.4 | 96 |
| C4 | 17 | 0.8 | 90 |
| D4 | 17 | 1.2 | 86 |
| E4 | 17 | 2 | 86 |
| F4 | 17 | 4 | 84 |
| G4 | 17 | 8 | 65 |
| H4 | 17 | 12 | 60 |

It is found from the above results that when the particle size ratio is from 0.02 to 0.5, or in the batteries B1 to G1, B2 to G2, J1 to N1, J2 to N2, A3 to B3 and A4 to B4, high capacity maintenance ratios as well as favorable cycle characteristics are exhibited. As opposed to this, the batteries H1, H2, O1, O2, C3 to H3 and C4 to H4 do not have appropriate electron conductive networks, and this is considered to cause a decrease in charge/discharge efficiency of these batteries.

It is also considered that the ratios of particle sizes of the batteries A1, A2, I1 and I2 were so small that the electron resistances of these batteries became smaller to deteriorate the cycle characteristics thereof.

It should be noted that in Examples 3 and 4, the negative electrode materials with a mean particle size of 17 µm were used for consideration, but in using fine powder materials having the same composition as the above negative electrode material and a mean particle size of about from 0.1 to 10 µm, the similar effect was obtained.

Further, although the coin type batteries were used for the tests in the present examples, in tests where cylindrical batteries or stacked type batteries were used, the similar results were obtained.

INDUSTRIAL APPLICABILITY

As thus described, according to the present invention, a non-aqueous electrolyte secondary battery, where reduction in discharge capacity due to cycles is improved, can be provided.

What is claimed is:

1. A non-aqueous electrolyte secondary battery comprising negative electrode containing: a negative electrode material composed of a composite particle having a core particle and a coating layer covering at least a part of surface of said core particle and capable of absorbing and desorbing lithium; and a conductive material composed of a graphite particle, characterized in that (a) a solid phase A constituting said core particle is composed of at least one element selected from the group consisting of silicon and tin, (b) a solid phase B constituting said coating layer is composed of a solid solution or an intermetallic compound, which comprises an element constituting said solid phase A and at least one element selected from the group consisting of elements of the second to the fourteenth Groups except silicon, tin, and carbon, and (c) the ratio of the median diameter "Dc" of said conductive material to the median diameter "Da" of said negative electrode material (Dc/Da) is from 0.02 to 0.5.

2. The non-aqueous electrolyte secondary battery in accordance with claim 1, characterized in that said solid phase A is composed of tin and said solid phase B is composed of $Ti_2Sn$.

3. The non-aqueous electrolyte secondary battery in accordance with claim 1, characterized in that said solid phase A is composed of silicon and said solid phase B is composed of $TiSi_2$.

4. The non-aqueous electrolyte secondary battery in accordance with claim 1, characterized in that from 5 to 60 parts by weight of said conductive material are contained per 100 parts by weight of said negative electrode material.

5. The non-aqueous electrolyte secondary battery in accordance with claim 1, characterized in that said negative electrode material has a median diameter of from 0.1 to 500 µm.

* * * * *